United States Patent
Ng et al.

(10) Patent No.: US 10,498,257 B2
(45) Date of Patent: Dec. 3, 2019

(54) SWITCHING POWER CONVERTERS CONTROLLED WITH CONTROL SIGNALS HAVING VARIABLE ON-TIMES

(71) Applicant: Astec International Limited, Kowloon (HK)

(72) Inventors: Weng Fai Ng, Tseung Kwan O (HK); Wai Chung Li, Tuen Mun (HK); Kwok Wai Lo, Fo Tan (HK); Zhi Zhi Li, Kowloon (HK); Chun Shing Cheng, Tseung Kwan O (HK); Ka Kit Li, Yuen Long (HK)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/628,231

(22) Filed: Jun. 20, 2017

(65) Prior Publication Data

US 2018/0006577 A1   Jan. 4, 2018

Related U.S. Application Data

(60) Provisional application No. 62/356,927, filed on Jun. 30, 2016.

(51) Int. Cl.
| | |
|---|---|
| *H02M 1/42* | (2007.01) |
| *H02M 1/08* | (2006.01) |
| *H02M 1/00* | (2006.01) |
| *H02M 7/525* | (2006.01) |
| *H02M 1/084* | (2006.01) |
| *H02M 3/157* | (2006.01) |

(Continued)

(52) U.S. Cl.
CPC ......... *H02M 7/525* (2013.01); *H02M 1/0845* (2013.01); *H02M 1/4208* (2013.01); *H02M 1/4225* (2013.01); *H02M 3/157* (2013.01); *H02M 7/21* (2013.01); *H02M 7/505* (2013.01); *Y02B 70/126* (2013.01)

(58) Field of Classification Search
CPC .... H02M 1/42; H02M 1/4208; H02M 1/4258; H02M 1/081; H02M 1/082; H02M 1/083; H02M 1/4225; H02M 2001/0022
See application file for complete search history.

(56) References Cited

U.S. PATENT DOCUMENTS

| | | | |
|---|---|---|---|
| 5,600,546 A | 2/1997 | Ho et al. | |
| 7,535,734 B2 * | 5/2009 | Li | H02M 1/4258 323/207 |

(Continued)

*Primary Examiner* — Yusef A Ahmed
*Assistant Examiner* — Sisay G Tiku
(74) *Attorney, Agent, or Firm* — Harness, Dickey & Pierce, P.L.C.

(57) ABSTRACT

A control circuit is configured to sense an AC input voltage of a power factor correction (PFC) power circuit in a switching power converter, provide a control signal having an on-time and an off-time to at least one power switch of the PFC power circuit, and in response to detecting a peak voltage of the AC input voltage, increase the on-time of the control signal based on the sensed AC input voltage during an interval that begins with the peak voltage of the AC input voltage and ends with the next zero crossing following the peak voltage of the AC input voltage to improve a power factor of the switching power converter. Other example switching power converters, PFC power circuits and control circuits for controlling one or more power switches are also disclosed.

16 Claims, 6 Drawing Sheets

(51) Int. Cl.
*H02M 7/21* (2006.01)
*H02M 7/505* (2006.01)

(56) References Cited

U.S. PATENT DOCUMENTS

| | | | | |
|---|---|---|---|---|
| 8,503,204 B2* | 8/2013 | Carletti | ............... | H02M 1/42 363/78 |
| 8,564,991 B2* | 10/2013 | Zhang | ............... | H02M 1/4225 323/259 |
| 9,042,127 B2* | 5/2015 | Gong | ............... | H02M 7/217 363/21.13 |
| 9,118,258 B2* | 8/2015 | Li | ............... | H02M 1/4258 |
| 9,307,586 B2* | 4/2016 | Imam | ............... | H02M 3/33507 |
| 9,331,588 B2* | 5/2016 | Chen | ............... | H02M 3/33523 |
| 9,450,496 B2* | 9/2016 | Sigamani | ............ | H02M 3/33546 |
| 9,531,257 B2* | 12/2016 | Zhang | ............... | H02M 1/4225 |
| 2005/0225265 A1* | 10/2005 | Ribarich | ............... | H05B 41/28 315/291 |
| 2006/0245219 A1* | 11/2006 | Li | ............... | G05F 1/565 363/89 |
| 2007/0085517 A1* | 4/2007 | Ribarich | ............... | G05F 1/70 323/235 |
| 2009/0016087 A1* | 1/2009 | Shimizu | ............... | H02M 1/4225 363/89 |
| 2010/0014329 A1* | 1/2010 | Zhang | ............... | H02M 1/4225 363/89 |
| 2011/0101898 A1* | 5/2011 | Shinomoto | ............ | H02M 1/126 318/400.3 |
| 2012/0044725 A1* | 2/2012 | Wrathall | ............... | G05F 1/70 363/45 |
| 2013/0094255 A1* | 4/2013 | Yeh | ............... | H02M 1/4208 363/44 |
| 2014/0028211 A1* | 1/2014 | Imam | ............... | H02M 3/33507 315/200 R |

* cited by examiner

SWITCHING POWER CONVERTERS CONTROLLED WITH CONTROL SIGNALS HAVING VARIABLE ON-TIMES

CROSS-REFERENCE TO RELATED APPLICATION

This application claims the benefit of U.S. Provisional Application No. 62/356,927 filed Jun. 30, 2016. The entire disclosure of the above application is incorporated herein by reference.

FIELD

The present disclosure relates to switching power converters controlled with control signals having variable on-times.

BACKGROUND

This section provides background information related to the present disclosure which is not necessarily prior art.

Switching power converters convert an electrical power using one or more power switches. Switching power converters commonly include power factor correction (PFC) circuits to correct a power factor between an AC voltage and an AC current. Sometimes, the PFC circuits may be controlled to operate in one or more modes including, for example, a continuous conduction mode, a critical conduction mode, etc.

SUMMARY

This section provides a general summary of the disclosure, and is not a comprehensive disclosure of its full scope or all of its features.

According to one aspect of the present disclosure, a switching power converter includes a PFC power circuit having at least one power switch and an input for receiving an AC input voltage and an AC input current, and a control circuit coupled to the PFC power circuit to control the at least one power switch. The PFC power circuit is controllable to improve a power factor of the switching power converter. The control circuit is configured to sense the AC input voltage of the PFC power circuit, provide a control signal having an on-time and an off-time to the at least one power switch, and in response to detecting a peak voltage of the AC input voltage, increase the on-time of the control signal based on the sensed AC input voltage during an interval that begins with the peak voltage of the AC input voltage and ends with the next zero crossing following the peak voltage of the AC input voltage to improve the power factor of the switching power converter.

According to another aspect of the present disclosure, a control circuit for controlling at least one power switch in a PFC power circuit of a switching power converter is disclosed. The PFC power circuit is controllable to improve a power factor of the switching power converter. The control circuit is configured to sense an AC input voltage of the PFC power circuit, provide a control signal having an on-time and an off-time to the at least one power switch of the PFC power circuit, and in response to detecting a peak voltage of the AC input voltage, increase the on-time of the control signal based on the sensed AC input voltage during an interval that begins at the peak voltage of the AC input voltage and ends at the next zero crossing following the peak voltage of the AC input voltage to improve the power factor of the switching power converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or features throughout the several views of the drawings.

DETAILED DESCRIPTION

Figure 1:
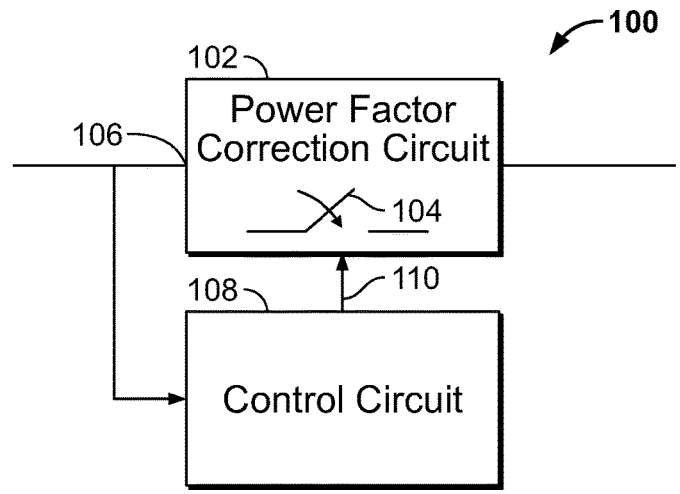
FIG. 1 is a block diagram of a switching power converter including a PFC power circuit having a power switch, and a control circuit coupled to the PFC power circuit to control the power switch, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switching power converter according to one example embodiment of the present disclosure is illustrated in FIG. 1 and indicated generally by reference number 100. As shown in FIG. 1, the switching power converter 100 includes a PFC power circuit 102 including a power switch 104 and an input 106 for receiving an AC input voltage Vac and an AC input current Iac, and a control circuit 108 coupled to the PFC power circuit 102 to control the power switch 104. The PFC power circuit 102 is controlled to improve a power factor of the switching power converter 100. The control circuit 108 senses the AC input voltage Vac of the PFC power circuit 102, provides a control signal 110 having an on-time and an off-time to the power switch 104, and in response to detecting a peak voltage of the AC input voltage Vac, increases the on-time of the control signal 110 based on the sensed AC input voltage Vac during an interval that begins with the peak voltage of the AC input voltage and ends with the next zero crossing following the peak voltage of the AC input voltage to improve the power factor of the switching power converter 100.

Figure 2:
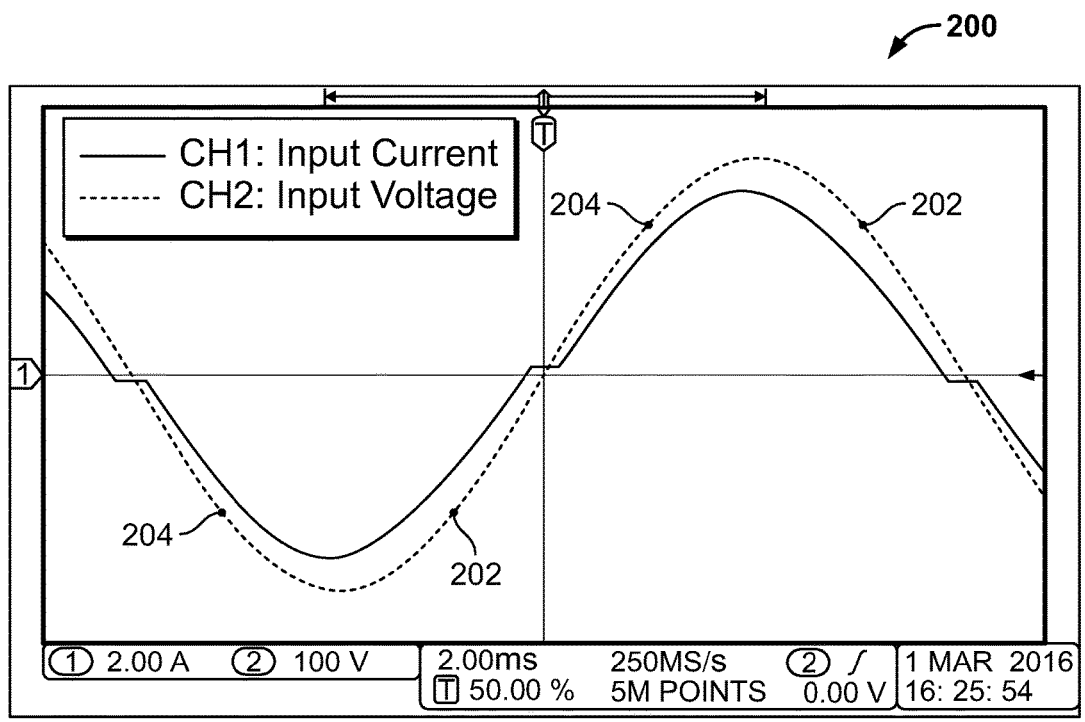
FIG. 2 is a graph of an AC input voltage and an AC input current provided to the PFC power circuit of FIG. 1 in which the on-time of a control signal controlling the power switch is not adjusted, according to another example embodiment.

For example, a power factor between the AC input voltage Vac and the AC input current Iac in the PFC power circuit 102 may be unsatisfactory. In some examples, and as recognized by the inventors, the AC input current Iac may lead the AC input voltage Vac and/or the AC input current Iac may have an amplitude less than an amplitude of the AC input voltage Vac, as shown in the graph 200 of FIG. 2. The unsatisfactory power factor may occur, for example, when the PFC power circuit 102 is controlled in its critical conduction mode. This leading current and/or difference in amplitudes may be caused by, for example, filters capacitors (e.g., X-capacitors), fixed on-time control schemes, etc. As shown in FIG. 2, the power factor on a falling edge of the AC input voltage (generally indicated by reference number 202) is worse than on a rising edge of the AC input voltage (generally indicated by reference number 204).

Figure 3:
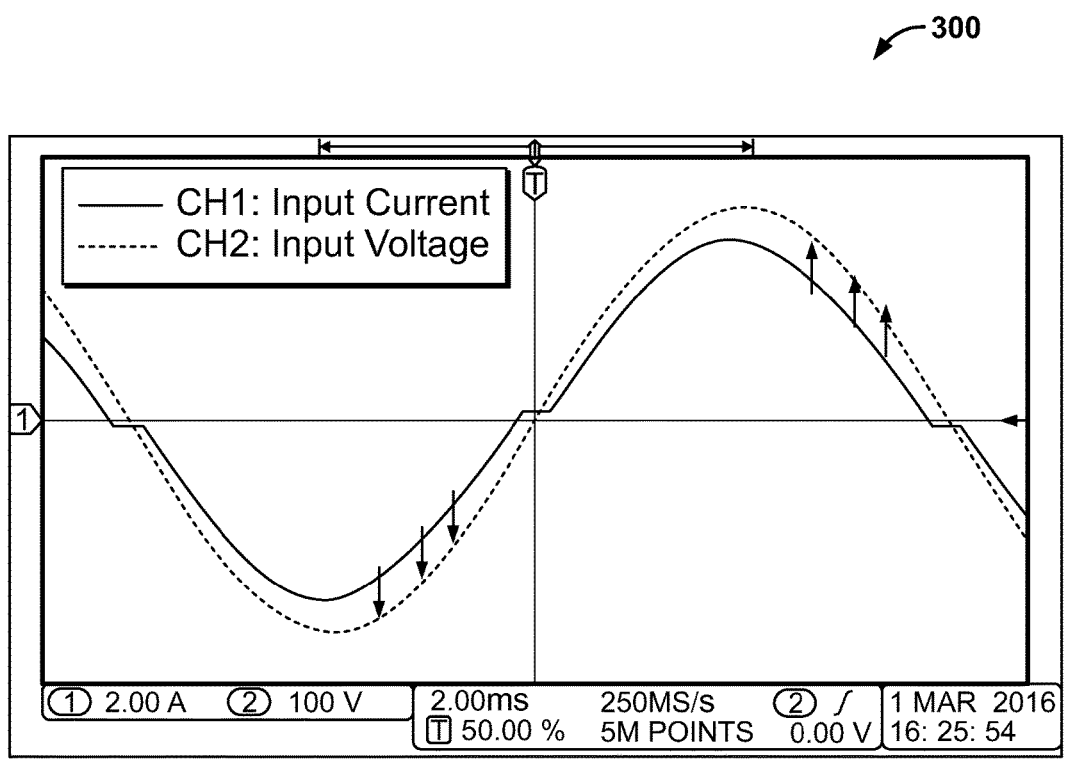
FIG. 3 is a graph of an AC input voltage and an AC input current provided to the PFC power circuit of FIG. 1 in which the on-time of a control signal controlling the power switch is adjusted, according to yet another example embodiment.

As recognized by the subject inventors, the power factor may be improved by, for example, increasing the AC input current Iac such that the current becomes more in align with the AC input voltage Vac. This may be accomplished by increasing the on-time of the control signal 110 for the power switch 104 in the PFC power circuit 102 during the AC input voltage's falling edge, as further explained below. For example, and as shown in FIG. 3, if the on-time of the control signal 110 is increased, the AC input current Iac may increase (shown by the arrows in FIG. 3) to better align with the AC input voltage Vac thereby improving the power factor of the power converter 100.

As explained above, the control circuit 108 of FIG. 1 may detect the peak voltage of the AC input voltage Vac. This peak voltage may be detected in various ways. For example, the control circuit 108 may determine the peak voltage based on the sensed AC input voltage Vac. In such examples, the control circuit 108 monitors the AC input voltage Vac and determine when the voltage reaches its peak (e.g., between its rising edge and its falling edge). The control circuit 108 may determine the peak voltage by, for example, repeatedly monitoring an instantaneous AC input voltage and identifying when the instantaneous AC input voltage begins to decrease. In other embodiments, the control circuit 108 may detect the peak voltage by determining when a slope of the AC input voltage (which corresponds to the instantaneous value of the AC input voltage) begins to decrease, is substantially zero, etc.

In some embodiments, the control circuit 108 may detect each peak voltage in an AC cycle. For example, the control circuit 108 may detect the peak voltage (e.g., amplitude) of the positive half cycle and the peak voltage (e.g., amplitude) of the negative half cycle in the AC cycle. If, for example, the AC input is rectified (as further explained below), the control circuit 108 may detect two peak voltages (e.g., substantially 180 degrees apart), four peak voltages (e.g., substantially 90 degrees apart), etc. of the positive half cycles. Additionally and/or alternatively, the control circuit 108 may detect a single peak voltage every AC cycle (e.g., once every 360 degrees) if desired.

As explained above, the on-time of the control signal 110 is increased based on the sensed AC input voltage Vac. For example, the control circuit 108 may increase the on-time of the control signal 110 based on a slope of the sensed AC input voltage Vac. In such examples, the on-time of the control signal 110 may increase as the slope of the sensed AC input voltage Vac increases. For example, the slope of the sensed AC input voltage Vac at its peak voltage is substantially zero and may increase for a defined period of time (e.g., between the peak voltage and a zero crossing, etc.). During this period of time, the on-time of the control signal 110 may increase based on this increasing slope of the sensed AC input voltage Vac. Thus, the control signal 110 may be adaptive based on the AC input voltage Vac.

In some embodiments, the control circuit 108 may include a lookup table (e.g., saved in memory) having corresponding slopes and on-times for determining an appropriate on-time. In such examples, particular on-times may be determined (e.g., selected) from the lookup table based on the determined slope of the sensed AC input voltage Vac. In other embodiments, the control circuit 108 may calculate an appropriate on-time based on the slope of the sensed AC input voltage Vac, and/or use another suitable method of determining an appropriate on-time.

As explained above, the control circuit 108 increases the on-time of the control signal 110 during an interval that begins with the peak voltage of the AC input voltage and ends with the next zero crossing following the peak voltage of the AC input voltage. After which, the on-time of the control signal 110 can revert back to its normal condition if desired.

In some examples, the control circuit 108 may increase the on-time of the control signal 110 during the entirety of the interval. For example, the control circuit 108 may increase the on-time of the control signal 110 after detecting the peak voltage and until the next zero crossing of the AC input voltage Vac is detected. As explained above, the slope of the sensed AC input voltage Vac continues to increase until the AC input voltage Vac reaches a zero crossing. Thus, because the on-time of the control signal 110 may be based on this increasing slope of the sensed AC input voltage Vac, the on-time of the control signal 110 increases until the AC input voltage Vac reaches its next zero crossing. After the AC input voltage Vac reaches its next zero crossing, the control circuit 108 may control the control signal 110 in its normal mode (e.g., without increasing its on-time). The control circuit 108 may then once again increase the on-time of the control signal 110 during another interval (e.g., the next interval) that begins with another peak voltage (e.g., the next peak voltage) of the AC input voltage and ends with the next zero.

In some embodiments, the on-time of the control signal 110 may be increased to a maximum value when the AC input voltage Vac substantially approaches its zero crossing. For example, the on-time of the control signal 110 may be normally about 5 µs (e.g., during a rising edge of the AC input voltage). Additional on-time of about 0.25 µs may be added after detecting the peak voltage of the AC input voltage Vac. Thus, the total on-time of the control signal 110 can increase to about 5.25 µs. After which, the additional on-time may increase again to about 0.6 µs, and then to about 1.2 µs as the AC input voltage approaches its zero crossing. In such examples, the total on-time of the control signal 110 may increase to about 5.6 µs and about 6.2 µs, respectively. Thus, the additional on-time (and therefore the total on-time) of the control signal 110 continues to increase during the falling edge of the AC input voltage signal.

Additionally, the on-time of the control signal 110 may continually increase based on the slope of the sensed AC input voltage Vac. Alternatively, the on-time of the control signal 110 may intermittently (e.g., periodically or randomly) increase based on the slope of the sensed AC input voltage Vac. This continuous or intermittent increase in the control signal on-time may last until the AC input voltage Vac has reached its next zero crossing (as explained above), and/or another suitable parameter is reached.

Figure 4:
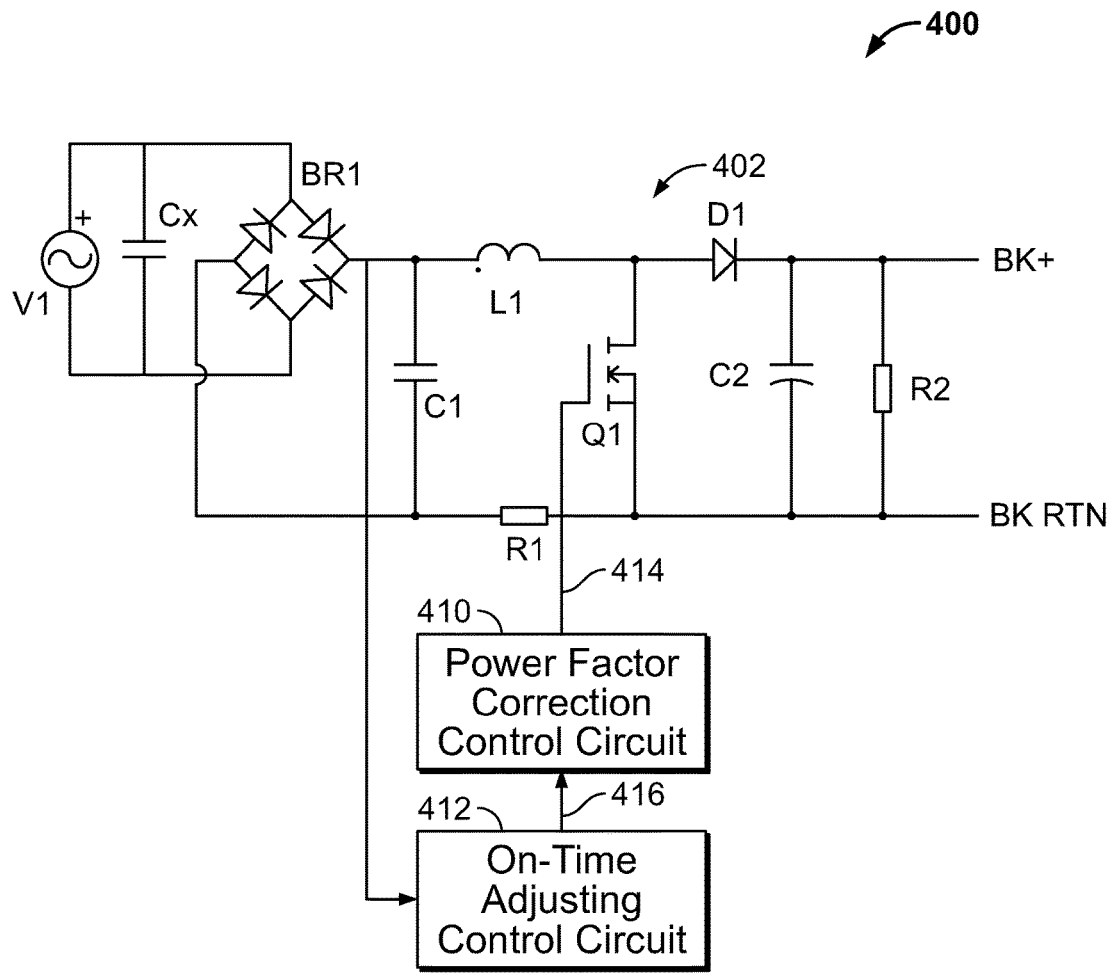
FIG. 4 is a circuit diagram of a switching power converter including a full-wave bridge rectifier, a PFC power circuit having a power switch, a control circuit that senses a rectified AC voltage, and another control circuit that adjusts the on-time of a control signal controlling the power switch, according to another example embodiment.

In some embodiments, it may be desirable to rectify the AC input of provided to the PFC power circuit 102. For example, FIG. 4 illustrates a switching power converter 400 including a PFC power circuit 402 having an inductive element L1, a diode D1, and a power switch Q1 coupled between the inductive element L1 and the diode D1, and a rectifying circuit BR1 coupled to the inductive element L1 (e.g., an input) of the PFC power circuit 402. In some examples, the switching power converter 400 may be considered a multistage power converter having two stages (e.g., the rectifying circuit BR1 and the PFC power circuit 402) coupled together.

As shown in FIG. 4, the switching power converter 400 includes two control circuits. Specifically, the power converter 400 includes a PFC control circuit 410 and an on-time adjusting control circuit 412 coupled to the PFC control circuit 410. As shown, the PFC control circuit 410 provides a control signal 414 (e.g. a pulse width modulated (PWM) signal, etc.) to the PFC power circuit 402 for controlling the power switch Q1, as explained above.

The on-time adjusting control circuit 412 senses the rectified AC input voltage of the PFC power circuit 402 and provides a variable signal 416 to the PFC control circuit 410. This variable signal 416 may be adjusted to increase the on-time of the control signal 414, and in turn, the AC input current as explained above. Thus, the control signal 414 may be adaptive based on the AC input voltage.

The variable signal 416 may be adjusted in numerous ways. For example, the control circuit 412 may adjust a duty cycle of the variable signal 416 as necessary to increase the on-time of the control signal 414. For example, the control signal 414 may change state (e.g., transition between high and low) based on a signal related to the AC input voltage. In such examples, the control signal 414 may be high when the signal is at and/or above a defined value (e.g., based on parameters of the control circuit 410) and low when the signal is at another defined value (e.g., based on parameters of the control circuit 410). The duty cycle of the variable signal 416 may be adjusted accordingly to ensure the signal controlling the state of the control signal 414 remains high for a longer period of time. This in turn increases the on-time of the control signal 414.

For example, the control circuit 412 can decrease the duty cycle of the variable signal 416 to increase the on-time of the control signal 414. By way of example only, an AC power source (V1) of the switching power converter 400 may provide an input voltage of about 115 VAC RMS. Thus, the peak voltage of the 115 VAC waveform is about 162.6V (i.e., 115*1.414). During the falling edge of the AC input voltage (e.g., after the peak voltage is detected), the voltage may drop from about 145V to about 125V. Based on this decreasing input voltage, the duty cycle of the variable signal 416 may decrease from about 80% to about 65%. If the AC input voltage drops from about 125V to about 105V, the duty cycle of the variable signal 416 may decrease from about 65% to about 45%. If the AC input voltage drops from about 105V to about 55V, the duty cycle of the variable signal 416 may decrease from about 45% to about 10%. During this time, the switching frequency of the variable signal 416 may remain fixed (e.g., at about 20 kHz). This decrease in the duty cycle can continue until the AC input voltage reaches its zero crossing, as explained above. Each decrease in the duty cycle of the variable signal 416 causes a corresponding increase in the on-time of the control signal 414.

Likewise, if the AC power source (V1) of the switching power converter 400 provides an input voltage of about 230 VAC RMS, the peak voltage of the waveform is about 325.22V (i.e., 230*1.414). If the AC input voltage drops from its peak voltage to about 315V, the duty cycle of the variable signal 416 may decrease to about 75% (at a fixed frequency such as 20 kHz). If the AC input voltage drops from about 315V to about 210V, the duty cycle of the variable signal 416 may decrease from about 75% to about 45%. If the AC input voltage drops from about 210V to about 110V, the duty cycle of the variable signal 416 may decrease from about 45% to about 10%. As explained above, this decrease in the duty cycle can continue until the AC input voltage reaches its zero crossing.

Alternatively, the on-time of the control signal 414 may be increased in other suitable ways. For example, the control circuit 410 (and/or another suitable control circuit) may be designed such that an increase in the duty cycle of the variable signal 416 increases the on-time of the control signal 414.

As shown in FIG. 4, the rectifying circuit BR1 includes four diodes arranged as a full-wave bridge rectifier. It should be apparent to those skilled in the art that other suitable rectifying circuits including half-wave bridge rectifiers, rectifiers having switches, etc. may be employed without departing from the scope of the present disclosure.

Figure 5:
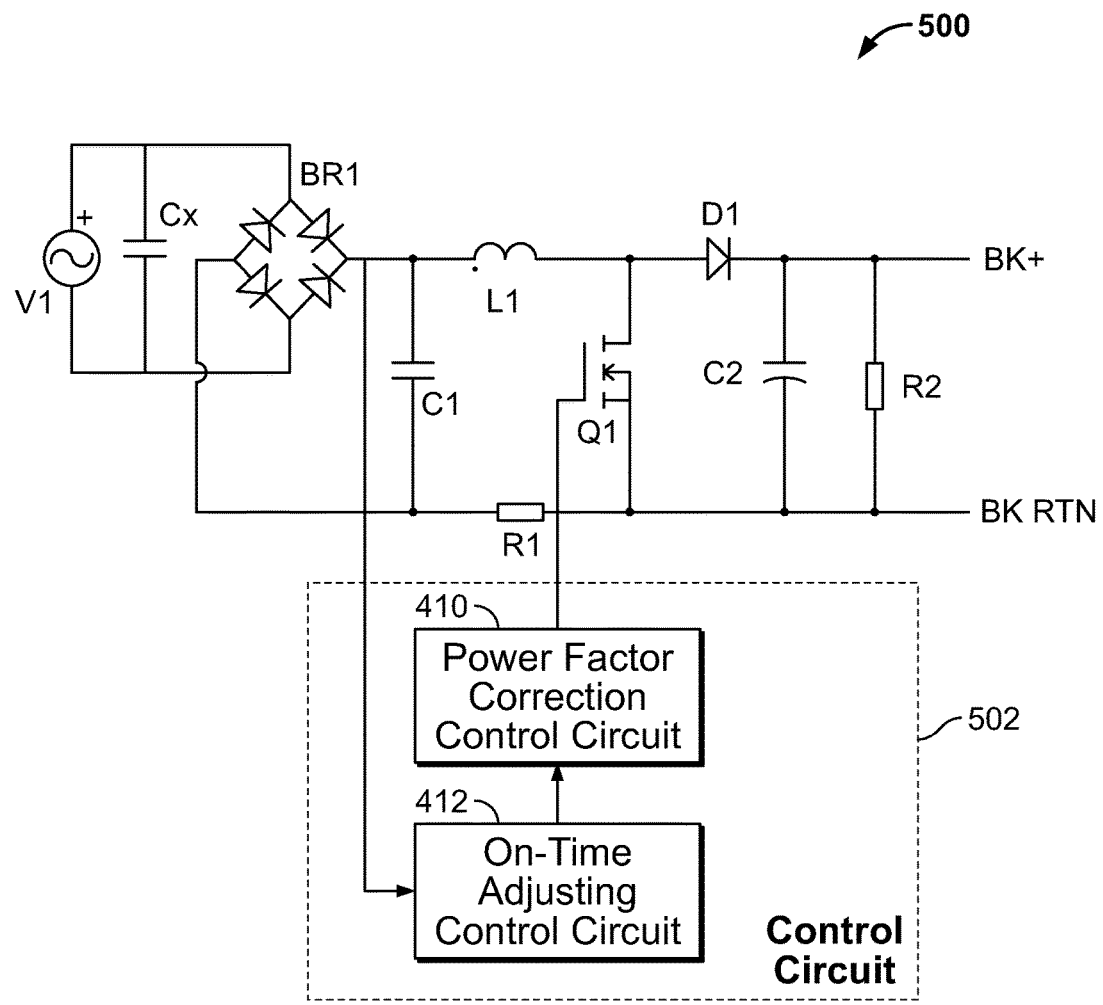
FIG. 5 is a circuit diagram of the switching power converter of FIG. 4, where the two control circuits are components in a system controller, according to yet another example embodiment.

Additionally, although the PFC control circuit 410 and the on-time adjusting control circuit 412 are shown as separate control circuits in FIG. 4, it should be apparent to those skilled in the art that at least a part of one or both control circuits 410, 412 may be a component of a system control circuit, combined into one control circuit, etc. For example, FIG. 5 illustrates a switching power converter 500 substantially similar to the switching power converter 400 of FIG. 4, but where the control circuits 410, 412 are components of a system control circuit 502.

The features disclosed herein may be implemented in one or more hardware components and/or software. For example, instructions for performing any one or more of the features disclosed herein may be stored in and/or transferred from a non-transitory computer readable medium, etc. to one or more existing control circuits, new control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

For example, the computer readable medium may include instructions for at least sensing an AC input voltage of a PFC power circuit having at least one power switch, providing a control signal having an on-time and an off-time to the at least one power switch, and in response to detecting a peak voltage of the AC input voltage, increasing the on-time of the control signal based on the sensed AC input voltage to increase an AC input current.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). Additionally, the entire control circuit, some of the control circuit, or none of the control circuit may be positioned on an integrated circuit.

Figure 6:
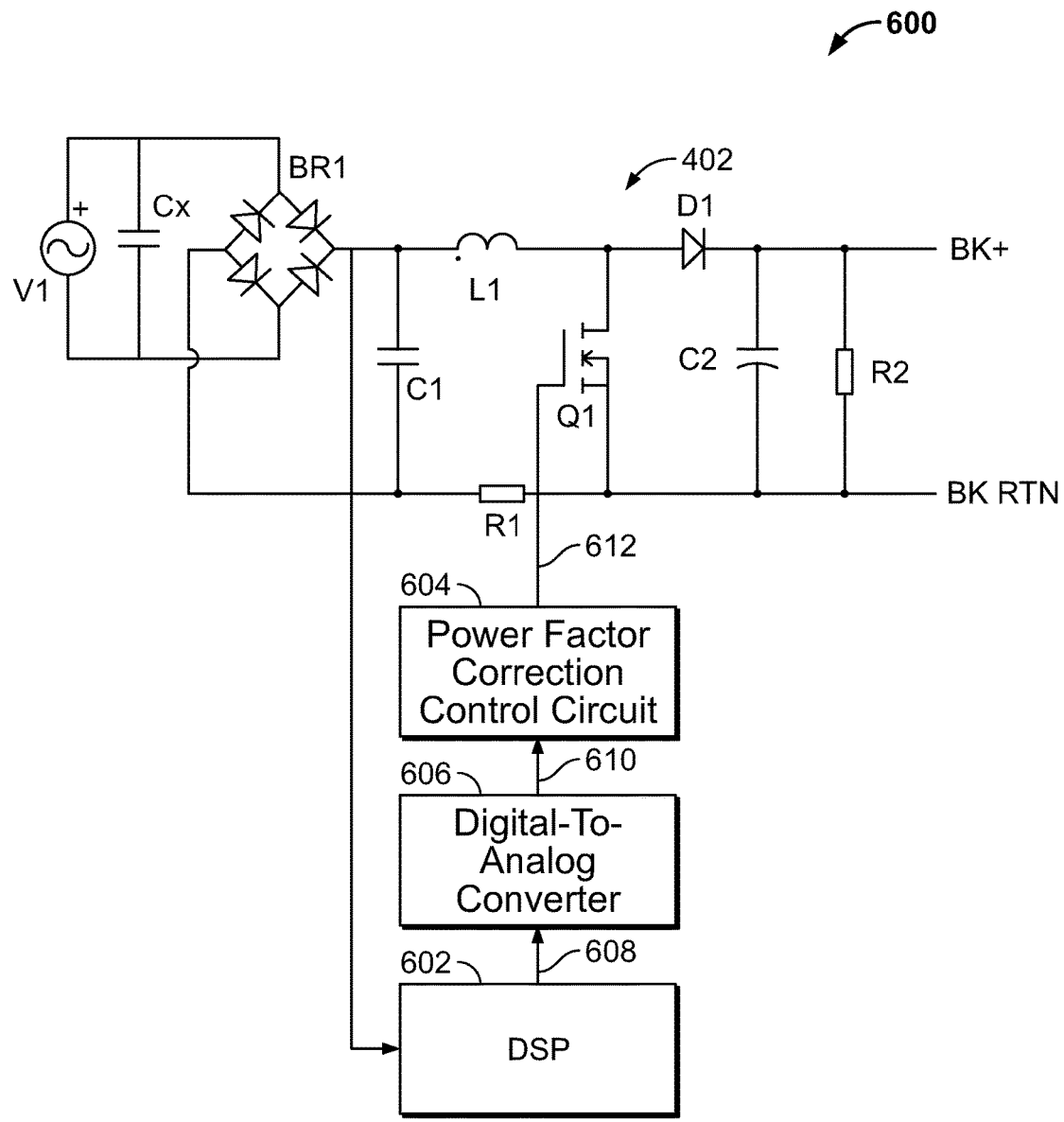
FIG. 6 is a circuit diagram of a switching power converter including a PFC power circuit, and a control circuit having a digital signal processor and a digital-to-analog converter for adjusting the on-time of a control signal controlling a power switch in the PFC power circuit, according to another example embodiment.

In some embodiments, the control circuit of a particular power converter preferably includes digital control circuitry and analog control circuitry. For example, FIG. 6 illustrates a switching power converter 600 substantially similar to the switching power converter 400 of FIG. 4, but including a control circuit having digital control circuitry. For example, the switching power converter 600 includes the PFC power circuit 402 of FIG. 4, a DSP 602, an analog PFC control circuit 604, and a digital-to-analog (D/A) converter 606 coupled between the DSP 602 and the analog control circuit 604. The control circuit 604 may function substantially similar to the control circuit 410 of FIG. 4. The D/A converter 606 may be any suitable D/A converter.

Similar to the on-time adjusting control circuit 412 of FIG. 4, the DSP 602 of FIG. 6 senses the rectified AC input voltage of the PFC power circuit 402. The DSP 602 then outputs a digital signal 608 to the D/A converter 606. The D/A converter 606 converts the digital signal 608 into a variable analog signal 610 and outputs the converted signal 610 to the analog control circuit 604. The control circuit 604 then provides a control signal 612 to the power switch Q1, as explained above. The digital signal 608 from the DSP 602 may be adjusted as necessary to increase the on-time of the control signal 612, and in turn, the AC input current as explained above.

Alternatively, the control circuit 604 may include digital control circuitry and/or the DSP 602 may be instead an analogy control circuit. In such examples, the D/A converter 606 may be eliminated and/or replaced with an analog-to-digital (A/D) converter.

Figure 7:
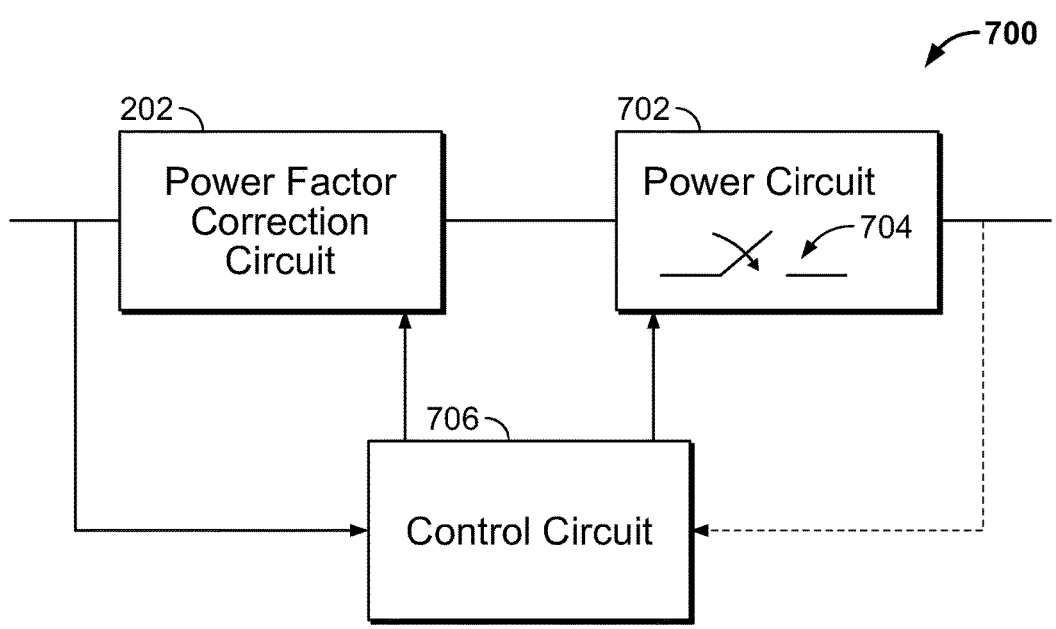
FIG. 7 is a block diagram of the switching power converter of FIG. 1, but including a power circuit coupled to the output of the PFC power circuit, according to yet another example embodiment.

The power converters disclosed herein each may include additional power circuitry coupled to its respective PFC power circuit. For example, FIG. 7 illustrates a switching power converter 700 including the PFC power circuit 102 of FIG. 1 and a power circuit 702 coupled to the PFC power circuit 102. In some examples, the power converter 700 may be considered a multistage power converter having two stages (e.g., the PFC power circuit 102 and the power circuit 702) coupled together.

As shown in FIG. 7, the power circuit 702 is coupled to an output of the PFC power circuit 102. As shown in FIG. 7, the power circuit 702 includes a power switch 704 for converting an input (e.g., an input voltage from the PFC power circuit 102) into an output.

Additionally, and as shown in FIG. 7, the power converter 700 includes a control circuit 706 that is substantially similar to the control circuit 108 of FIG. 1. The control circuit 706, however, can control the power switch 704 of the power circuit 702 in addition to the power switch (not shown) of the PFC power circuit 102, as explained above. For example, the control circuit 706 can control the power switch 704 to regulate an output voltage at the power circuit's output based on a sensed output voltage and/or a sensed output current.

The power circuits disclosed herein (e.g., the PFC power circuit 102 of FIGS. 1 and 7, the PFC power circuit 402 of FIG. 4, the power circuit 702 of FIG. 7, etc.) may have any suitable power converter topology. For example, the PFC power circuits disclosed herein can include a boost converter topology as shown in FIGS. 4-6, a buck converter, and/or another suitable power converter topology. Likewise, the power circuits coupled to the PFC power circuits can include various different power converter topologies including, for example, resonant power converters (e.g., quasi resonant power converters) having LLC resonant circuits, etc. In some embodiments, any one of the power converters may be part of a switched mode power supply (e.g., an AC-DC switched mode power supply, etc.) and/or another suitable power supply.

Additionally, the PFC power circuits disclosed herein may be controlled by a control circuit to operate substantially in its critical conduction mode. For example, any one of the PFC power circuits can include resonant components (e.g., inductive elements and/or capacitive elements) to ensure a power switch in that PFC power circuit switches on when the current falls to zero (e.g., soft switching).

The PFC power circuits as shown in FIGS. 2 and 4-7 each include at least one power switch. As such, the PFC power circuits may be considered active PFC power circuits. Additionally, although the PFC power circuits and the power circuit shown in FIGS. 2 and 4-7 include one power switch, it should be apparent to those skilled in the art that any one of the PFC power circuits and/or the power circuit can include more than one power switch. Further, although the PFC power circuits of FIGS. 4-6 are shown as a single phase PFC converter, it should be apparent that any one of the PFC power circuits can include a multiphase PFC converter with each phase including at least one power switch if desired.

The control circuits disclosed herein may sense an AC input voltage and/or an AC rectified voltage in any suitable manner. For example, the voltages may be sensed with voltage sensors which may or may not be a component in the control circuits. In some examples, the voltage sensors provide one or more signals representative of the sensed voltages to the control circuits.

As explained herein, an AC input current to a PFC power circuit may be increased by adaptively adjusting an on-time of a control signal that controls a power switch in the PFC power circuit. As a result, a power factor between the AC input current and the AC input voltage and a percent current total harmonic distortion (iTHD) in the PFC power circuit may improve. For example, testing has shown that the power factor between the AC input current and the AC input voltage improved from about 0.872 to about 0.924 at a 10% load, from about 0.952 to about 0.978 at a 20% load, from about 0.989 to about 0.995 at a 50% load, and from about 0.994 to about 0.998 at a 100% load when the on-time of the control signal is adaptively adjusted as disclosed herein. Likewise, testing has shown that the iTHD in the PFC power circuit decreased from about 13.63% to about 12.69% at a 10% load, from about 11.87% to about 8.25% at a 20% load, from about 7.33% to about 4.75% a 50% load, and from about 8.52% to about 4.09% at a 100% load when the on-time of the control signal is adaptively adjusted as disclosed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switching power converter comprising:
a power factor correction (PFC) power circuit controllable to improve a power factor of the switching power converter, the PFC power circuit including at least one power switch and an input for receiving an AC input voltage and an AC input current; and
a control circuit coupled to the PFC power circuit to control the at least one power switch, the control circuit configured to sense the AC input voltage of the PFC power circuit, detect a peak voltage of the AC input voltage, provide a control signal having an on-time and an off-time to the at least one power switch, and in response to detecting the peak voltage of the AC input voltage, increase the on-time of the control signal based on the sensed AC input voltage during the entirety of an interval that begins with the peak voltage of the AC input voltage and ends with a next zero crossing following the peak voltage of the AC input voltage to improve the power factor of the switching power converter.

2. The switching power converter of claim 1 wherein the control circuit is configured to increase the on-time of the control signal based on a slope of the sensed AC input voltage.

3. The switching power converter of claim 2 wherein the switching power converter is a multistage power converter including a first stage and a second stage coupled to the first stage, wherein the first stage of the multistage power converter includes the PFC power circuit, and wherein the second stage of the multistage power converter includes a power circuit.

4. The switching power converter of claim 1 wherein the control circuit includes a first control circuit configured to provide the control signal to the at least one power switch of the PFC power circuit, and a second control circuit configured to provide a variable signal to the first control circuit to increase the on-time of the control signal.

5. The switching power converter of claim 4 wherein the variable signal includes a duty cycle and wherein the second control circuit is configured to decrease the duty cycle of the variable signal in response to detecting the peak voltage of the AC input voltage.

6. The switching power converter of claim 5 wherein the control signal from the control circuit includes a pulse width modulated signal.

7. The switching power converter of claim 1 wherein the switching power converter is a multistage power converter including a first stage and a second stage coupled to the first stage, wherein the first stage of the multistage power converter includes a rectifying circuit, and wherein the second stage of the multistage power converter includes the PFC power circuit.

8. The switching power converter of claim 1 wherein the control circuit is configured to control the PFC power circuit to operate in a critical conduction mode.

9. The switching power converter of claim 1 wherein the control circuit includes a digital control circuit.

10. A control circuit for controlling at least one power switch in a power factor correction (PFC) power circuit of a switching power converter, the PFC power circuit controllable to improve a power factor of the switching power converter, the control circuit configured to sense an AC input voltage of the PFC power circuit, detect a peak voltage of the AC input voltage, provide a control signal having an on-time and an off-time to the at least one power switch of the PFC power circuit, and in response to detecting the peak voltage of the AC input voltage, increase the on-time of the control signal based on the sensed AC input voltage during the entirety of an interval that begins with the peak voltage of the AC input voltage and ends with a next zero crossing following the peak voltage of the AC input voltage to improve the power factor of the switching power converter.

11. The control circuit of claim 10 wherein the control circuit is configured to increase the on-time of the control signal based on a slope of the sensed AC input voltage.

12. The control circuit of claim 11 wherein the control circuit includes a first control circuit configured to provide the control signal to the at least one power switch of the PFC power circuit, and a second control circuit configured to provide a variable signal to the first control circuit to increase the on-time of the control signal.

13. The control circuit of claim 12 wherein the variable signal includes a duty cycle and wherein the second control circuit is configured to decrease the duty cycle of the variable signal in response to detecting the peak voltage of the AC input voltage.

14. The control circuit of claim 11 wherein the control signal from the control circuit includes a pulse width modulated signal.

15. The control circuit of claim 10 wherein the control circuit is configured to control the PFC power circuit to operate in a critical conduction mode.

16. The control circuit of claim 10 wherein the control circuit includes a digital control circuit.

* * * * *